May 24, 1960

C. E. BERRY 2,938,170

MEASURING SYSTEM

Filed April 13, 1956

INVENTOR.
CLIFFORD E. BERRY

BY

Christie, Parker & Hale
ATTORNEYS

May 24, 1960     C. E. BERRY     2,938,170
MEASURING SYSTEM
Filed April 13, 1956     2 Sheets-Sheet 2

INVENTOR.
CLIFFORD E. BERRY
BY
Christie, Parker & Hale
ATTORNEYS

United States Patent Office 2,938,170
Patented May 24, 1960

2,938,170

MEASURING SYSTEM

Clifford E. Berry, Altadena, Calif., assignor, by mesne assignments, to Bell & Howell Company, Chicago, Ill., a corporation of Illinois Filed Apr. 13, 1956, Ser. No. 577,979

7 Claims. (Cl. 330—9)

This invention relates to electrical measuring systems and particularly to such systems finding use under circumstances in which the signals to be measured are essentially constant in the region of interest but which change rapidly from one significant value to another.

This application is a continuation-in-part of my copending application Serial Number 317,105, filed October 27, 1952.

The measuring system associated with a mass spectrometer exemplifies the situation with which the invention is concerned. In such application successive peak signal values, obtained upon scanning different ion masses, are significant, whereas transient intervals are of little interest.

In sensitive measuring systems the random noise level is a limiting factor in the precision of measurement. At the same time it is well known that the noise level is a direct function of the band width, or otherwise expressed, an inverse function of the time constant of the measuring system. Theoretically, therefore, the noise level may be reduced to any desired value by the expedient of increasing the time constant. Any increase in the time constant, however, results in a corresponding decrease in the rate at which readings can be made. Heretofore it has been necessary in any such system to compromise between the allowable noise level and the allowable time in which a reading must be obtained.

The present invention is directed to circuitry enabling an increase in the rate of obtaining readings with a given noise level, or conversely, providing a lower noise level for a given rate of reading. This is accomplished in the disclosed circuitry by varying the time constant of the measuring system as an inverse function of the rate at which the signal to be measured is changing. The circuit then operates in such a fashion that when the signal is changing rapidly the time constant is small, allowing the measuring system to follow the rapid signal change. It follows that during this period of rapid signal change the noise level is high. In the type of system under consideration this does not represent a disadvantage since the transient periods are of no interest. When the signal is changing slowly or not at all, i.e. when it is at or immediately adjacent a significant value, the time constant is made large by the disclosed circuit and the noise level is low so that precise readings can be made. Even though the system is slow to respond to changes in this condition, the changes to which it must respond are small enough that negligible error due to the lag will be introduced.

To accomplish the foregoing objectives, the invention contemplates in a system for measuring an electrical signal and including amplification means for amplifying the signal, the combination comprising means operable to vary the time constant of the system as an inverse function of variation in the rate of change of the signal. Preferably variation of the time constant is not only inversely related to signal variation but is also made responsive to such variation in the rate of change of the signal.

The manner of accomplishing this variation in time constant as inverse function of the rate of change of the signal may take the form of a non-linear network connected in the grid circuit of one amplification stage of the measuring system. Such a non-linear network may take the form of a resistance-capacitance (RC) filter comprising a resistor and capacitor connected respectively in series and in parallel in the grid circuit with means for shorting out either the resistor or capacitor during periods of rapid signal change.

The system of the invention is not designed for use in measuring systems in which a continuous signal changing at varying rates is to be measured at any instant in time because of the fact that the noise level is unduly high during periods of rapid signal change and because its dynamical response is non-linear. Rather, it is adapted to such systems as the recordation of mass spectra, as mentioned above, where it is desired to measure the amplitudes of a sequence of signals which are essentially flat top pulses and where no information regarding the sides of the pulses is needed. It is also adapted to systems in which a series of quasi-steady signals of differing amplitude are sequentially switched into a single measuring device.

The invention will be more clearly understood by reference to the following detailed description thereof as taken in conjunction with the accompanying drawings, in which.

Figure 1:
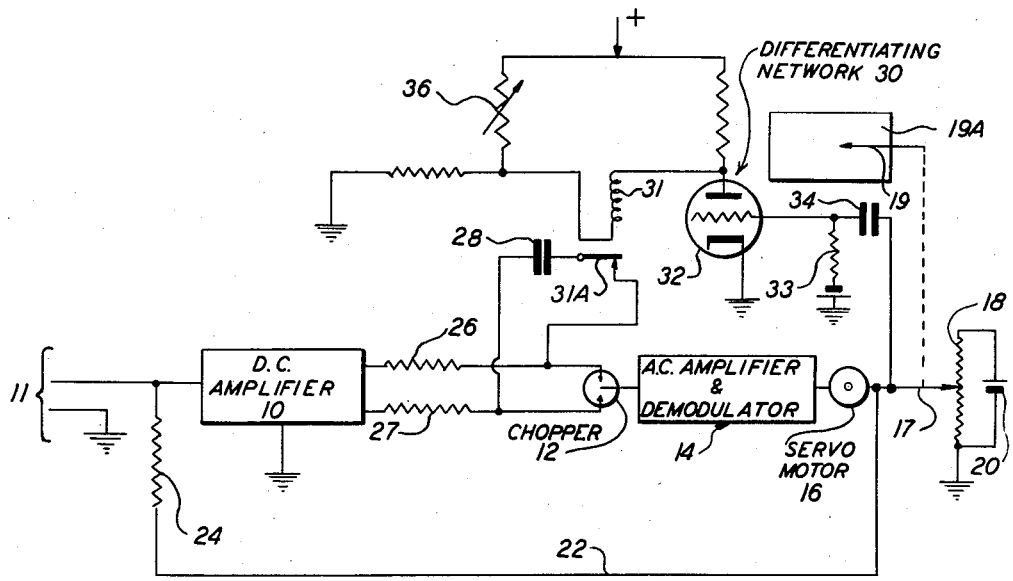
Fig. 1 is a circuit diagram of one embodiment of the invention as incorporated in a typical null type, self-balancing network.

The circuit shown in Fig. 1 is in part a conventional self-balancing potentiometer network including a D.C. amplifier 10 to which an input signal is applied at 11. The output of the amplifier is connected to a chopper 12, the output of which is applied to an A.C. amplifier and demodulator combination 14. The output of the A.C. amplifier (as appearing when the circuit is unbalanced) is connected to drive a servo motor 16 which in turn manipulates tap 17 of a potentiometer 18 across which a determined voltage is applied from a source 20. A recording pen 19 is connected to plot the excursions of potentiometer tap 17 on a strip chart 19A. The voltage tapped off by tap 17 is applied through a feedback loop 22 connected through grid leak resistor 24 to the D.C. amplifier 10. In operation any signal appearing at the output of the D.C. amplifier 10 is modulated in the chopper 12 and applied as an A.C. component to amplifier 14. The output of the A.C. amplifier drives servo motor 16 to set potentiometer 18 to a point at which the input to the D.C. amplifier is balanced to extinguish the unbalance output thereof. Hence at static conditions, i.e. during periods of no signal change, there will be no voltage across the chopper 12, the system remaining in null balance in such periods.

In accordance with the invention an RC filter network is incorporated between the D.C. amplifier 10 and chopper 12, i.e. in the grid circuit of amplifier 14, and comprises serially connected resistors 26, 27 in the output leads of the amplifier 10 and a parallel coupled capacitor 28 connected between the output leads of the amplifier. This RC filter is made to operate as a non-linear network by switching the capacitor out of the circuit whenever the rate of change of the signal input exceeds a predetermined value. When the capacitor is in the circuit the time constant is long and the noise low, and, conversely, when the capacitor is out of the circuit the time constant is short and the noise high.

In systems in which signals are introduced on a programmed basis the capacitor may be switched in and out of the circuit on a time basis and as a part of the programming. However, where such a program is not employed, it is desirable to provide automatic means for accomplishing this same function, such means being illustrated in the application as a differentiating network 30 connected to energize a relay 31 including a switch 31A in series with the capacitor 28. The differentiating network includes a triode 32, the grid of which is connected to a grid leak resistor 33 and through a capacitor 34 to the potentiometer tap 17 whereby the tube 34 is responsive to rapid changes in signal at the tap 17. The plate circuit of tube 32 is connected across the relay 31 and is balanced by a serially connected variable resistor 36 to energize the relay 31 at any predetermined signal level on the grid of tube 32.

Figure 2:
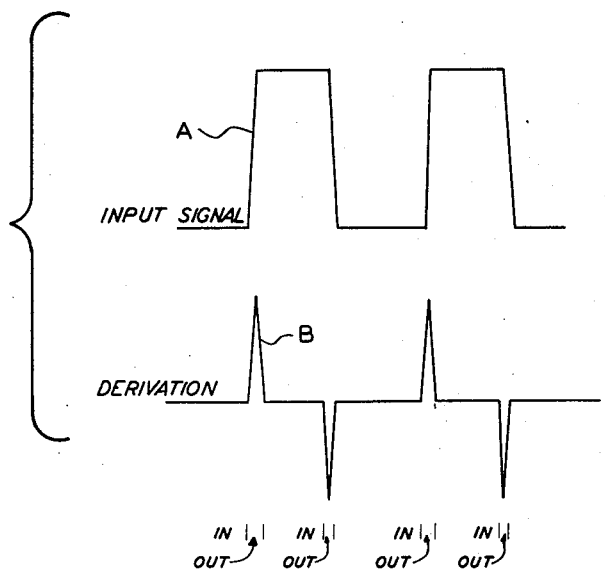
Fig. 2 is a graphic portrayal of the response of a portion of the apparatus of Fig. 1 as a function of the character of input signal.

The operation of the circuit may be explained in relation to the diagram of Fig. 2 in which curve A represents a typical pulse type input signal which may be derived, for example, from the collector electrode of a mass spectrometer and applied at input 11 of the apparatus of Fig. 1. The plate-bridge circuit of the differentiating network 30 is balanced by adjustment of resistor 36 so that no current flows with zero signal to the grid of tube 32. When a step function is applied to the differentiating network at capacitor 34, a transient current is established in the grid resistor 33. The resultant grid signal induces current flow in the plate circuit actuating relay 31. The derivation of the step function as developed in the network 30 is illustrated in curve B of Fig. 2.

During periods of constant signal amplitude as represented by the peaks and bases respectively of the pulses illustrated in curve A, the differentiating circuit has no output and the capacitor remains connected across the chopper 12. During these periods the system has a low noise level and a high time constant. During periods of rapid signal change as existing in the sides of the peaks of curve A, the differentiating circuit responds thereto as above described and as illustrated by curve B in Fig. 2, during which periods relay 31 is energized to cut capacitor 28 out of the circuit. During these intervals the circuit has a low time constant and high noise level, the latter characteristic being not objectionable in this circumstance since the peak values of the curve A are the significant values.

Figure 3:
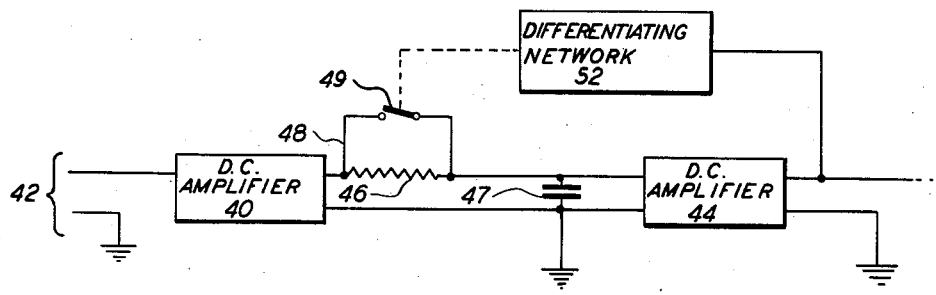
Fig. 3 is a modification of the circuitry of Fig. 1 as employed in a strictly D.C. amplification.

As mentioned above, the null balance system of Fig. 1 is characterized by the property that regardless of the signal level there is essentially no signal at the chopper during periods when the signal is not changing. This enables the capacitor to be switched in and out of the circuit as described without having to be charged or discharged and without the consequent transients which would otherwise be set up. The system shown in Fig. 3 is distinguished from that of Fig. 1 in that there is no point in the circuit at which the potential is zero when the rate of change of signal is zero. Hence, it is not practical to achieve non-linear response in the manner illustrated in Fig. 1.

The circuit of Fig. 3 comprises a D.C. amplifier 40 to which a signal is applied at input 42 and the output of which is applied to a second D.C. amplifier 44, the output of this amplifier being susceptible to measurement or recordation in conventional manner. In actuality, the amplifiers 40 and 44 are merely two stages of a single amplification system and are illustrated as separate amplifiers only for purposes of convenience. As in the foregoing embodiment, an RC filter is connected between first and second amplifiers and comprises a serially connected resistor 46 and a parallel connected capacitor 47. A shunt connection 48 including a switch 49 is connected across the resistor 46. The differentiating network 52, which may be the same as the network 30 of Fig. 1, is connected to the output of the second amplification stage 44 and to the switch 49 to actuate the switch responsive to differentiation of the output of the amplifier 44. In this circuit the differentiating network is responsive to rapid signal changes as appearing at the output of amplifier 44 to close switch 49 shorting out resistor 46 to achieve the desired short time constant during such periods of signal change. Conversely, as the signal reaches a stable value, switch 49 is opened so that during such periods of stability the system is characterized by a low noise level and a high time constant.

Figure 4:
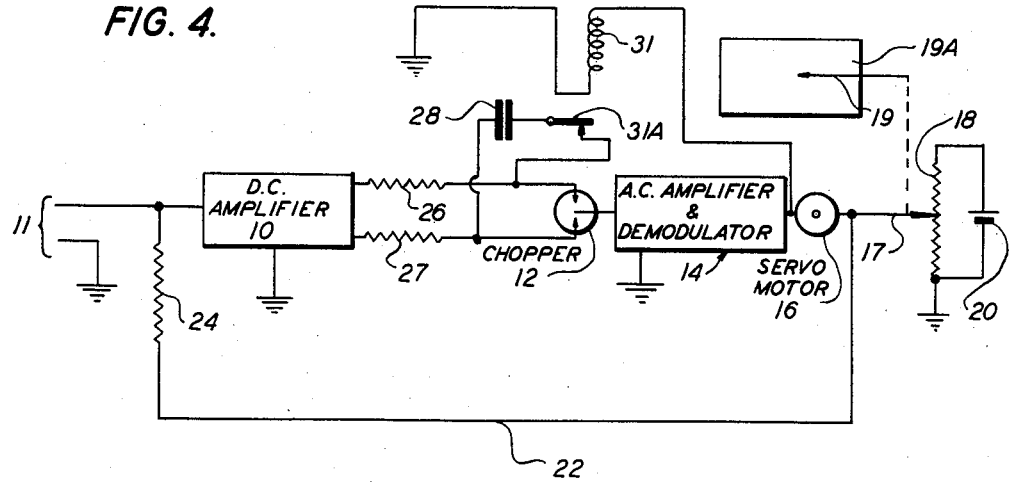
Fig. 4 is another modification of the circuitry of Fig. 1.

The circuit of Fig. 4 is similar to that of Fig. 1 and components of Fig. 4 similar to components of Fig. 1 are referred to by like numerals. The error signal from the servoamplifier 14 and applied to the servomotor 16 is used to actuate relay 31 directly which alters the time constant of the system. Whenever the recording pen is required to move, there will exist an error signal, which will open the relay 31 and remove the filter capacitor 28 from the circuit. Whenever the signal level is not changing, the error signal will be zero and the capacitor 28 will be left in the circuit, reducing the noise. The threshold adjustment of the relay is made in such a manner that small fluctuating error signals due to noise will not actuate the relay.

I claim:

1. In a system for measuring an electrical signal and including multiple-stage amplification means for amplifying the signal, the combination comprising an RC filter network including a resistor connected in series between the amplification stages and a capacitor connected in shunt across the input of the second stage, switch means connected across the resistor, a differentiating circuit connected to the output of the amplification means, and means responsive to the output of the differentiating circuit for actuating the switch means.

2. Apparatus according to claim 1 wherein the differentiating circuit comprises a tube including cathode, grid and plate, the grid being connected through a capacitor to the output of the amplification means, a bridge network connected to the plate and including balancing means and a coil connected in the bridge network and adapted to actuate the switch when energized.

3. A circuit for varying the time constant of an electrical system according to the rate of change of an input signal comprising a filter network including resistive and capacitive elements, switching means connected to the network operable to switch one of said elements out of the filter network for decreasing the time constant of the network, and means including a differentiating network coupled to the output of the filter network responsive to the rate of change of the input signal applied to the circuit for actuating said switching means when the rate of change of the input signal exceeds a predetermined value.

4. A filter circuit comprising a filter network having a pair of input terminals and a pair of output terminals, including a resistor element connected in series between an input terminal and an output terminal and a capacitor element connected in shunt across the output terminals, the network having a time constant determined by the product of the resistance of the resistor and the capacitance of the capacitor, a differentiating network for producing an output signal that is a function of the rate of change of an input signal applied thereto, means for coupling the output of the filter network to the input of the differentiating network, and switching means coupled to the output of said differentiating network for switching one of the filter elements effectively out of the filter network to change the time constant of said filter network when the rate of change of said applied signal exceeds a predetermined value.

5. Apparatus as defined in claim 4 wherein said last-named means includes means for decreasing the time constant of the filter network by a fixed predetermined amount.

6. Apparatus as defined in claim 5, wherein said means for decreasing the time constant includes a switch connected in shunt across the resistor.

7. Apparatus as defined in claim 5 wherein said means for decreasing the time constant includes a switch connected in series with the capacitor.

References Cited in the file of this patent

UNITED STATES PATENTS

| | | |
|---|---|---|
| 2,296,745 | Smith | Sept. 22, 1942 |
| 2,511,564 | Callah | June 13, 1950 |
| 2,646,502 | Bell | July 21, 1953 |
| 2,681,952 | Gilbert | June 22, 1954 |
| 2,764,686 | Luther | Sept. 25, 1956 |
| 2,774,940 | Bernet | Dec. 18, 1956 |